United States Patent [19]

Cooke

[11] 4,071,012
[45] Jan. 31, 1978

[54] FLUID FILL OR BLEED APPARATUS

[76] Inventor: Gordon R. Cooke, San Diego, Calif.
[73] Assignee: United States of America as represented by the Secretary of the Navy
[21] Appl. No.: 680,013
[22] Filed: Apr. 23, 1976
[51] Int. Cl. ............................................. F16k 43/00
[52] U.S. Cl. .................................... 137/321; 141/98; 222/552
[58] Field of Search ...................... 137/317, 321, 318; 141/98; 188/352; 222/83, 552

[56] References Cited

U.S. PATENT DOCUMENTS

| Re. 24,199 | 8/1956 | McDonald | 137/318 |
|---|---|---|---|
| 210,706 | 12/1878 | Penney | 137/318 |
| 308,161 | 11/1884 | Howard et al. | 137/321 |
| 2,414,911 | 1/1947 | Temple | 137/318 |
| 2,827,913 | 3/1958 | Wagner | 222/83 |
| 3,301,282 | 1/1967 | Fresolone, Jr. | 141/98 |
| 3,425,466 | 2/1969 | Grop | 141/98 |
| 3,480,036 | 11/1969 | Ehrens et al. | 137/318 |
| 3,552,421 | 1/1971 | Yocum | 137/321 |
| 3,554,217 | 1/1971 | Ehrens et al. | 137/321 |
| 3,584,662 | 6/1971 | Mattox et al. | 141/98 |
| 3,692,044 | 9/1972 | Wise | 137/318 |
| 3,809,359 | 5/1974 | Truelove, Sr. | 141/98 |
| 3,822,718 | 7/1974 | Peterson | 137/317 |

Primary Examiner—Martin P. Schwadron
Assistant Examiner—G. L. Walton
Attorney, Agent, or Firm—Richard S. Sciascia, Ervin F. Johnston

[57] ABSTRACT

An apparatus for filling or bleeding fluid out of a container which is closed by a plug wherein the apparatus includes a block which has a cavity. A gasket and a clamp are utilized for sealably attaching the block to the container so that the cavity can be sealed about the plug. The block has a pair of passageways which extend outwardly from the cavity to respective spaced apart ports. A fitting is connected in the port of one of the passageways for filling or bleeding fluid through the plug opening, and a screwdriver is slidably fitted through the other passageway for loosening or tightening the plug in the plug opening. The screwdriver may be sealed to its respective passageway by an O-ring when the screwdriver is inserted therethrough. In this manner, a seal of the container is maintained while (1) the plug is loosened, (2) while fluid is inserted in or bled from the container, and (3) while the plug is tightened in the plug opening.

6 Claims, 3 Drawing Figures

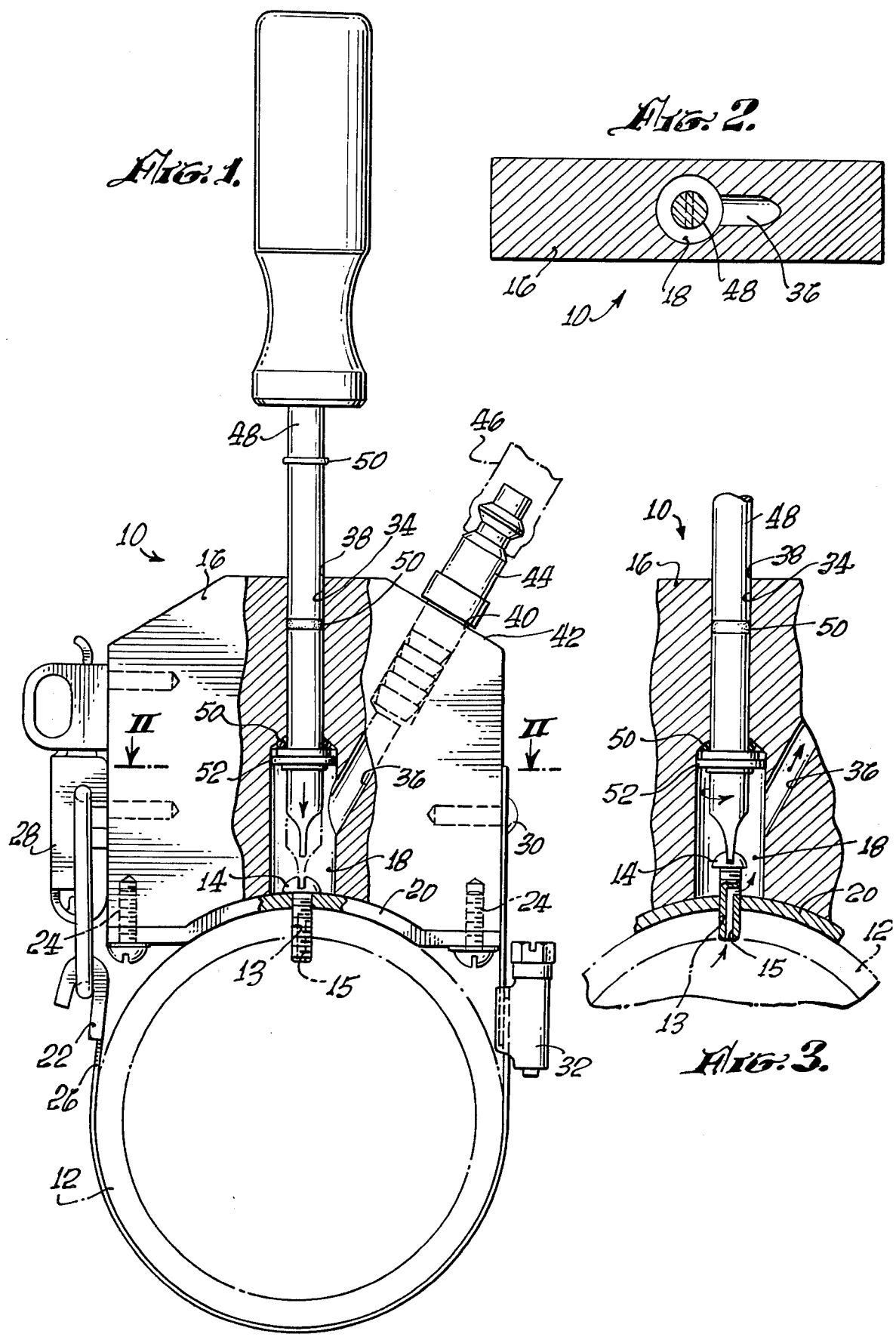

FLUID FILL OR BLEED APPARATUS

STATEMENT OF GOVERNMENT INTEREST

The invention described herein may be manufactured and used by or for the Government of the United States of America for governmental purposes without the payment of any royalties thereon, or, thereof.

BACKGROUND OF THE INVENTION

The present invention relates to an apparatus for filling or bleeding fluid out of a container which is closed by a plug.

Certain Navy applications require that oil-filled cables be towed from the stern of a ship. It is important that these cables be free of any air bubbles since any air entrapment in the cable causes degraded performance depending upon the depth at which the cable is towed. In the past, these air bubbles have been removed from these oil-filled cables by many man-hours of labor under hazardous conditions. A group of workmen was required to lay a large section of the cable on the fantail of the ship and stop it off so as to resist the pull of the remainder of the cable payed out from the stern of the ship. The cable is then raised progressively from stern to forward until the air bubbles are at a forward entry port of the cable, and then men stand on the cable to create a pressure to expel the bubbles from the port. Complete removal of all of the air bubbles is almost impossible by this procedure and, depending upon the sea state, this operation can be quite hazardous.

SUMMARY OF THE INVENTION

The present invention enables a towed oil-filled cable to be serviced from the fantail of a ship without laying a large section of the cable on the deck of a ship. The cables have spaced apart service points which have removable plugs so that fluid can be inserted or bled from respective cable sections. As the cable is payed out, each section can be serviced at it's respective service point so that air bubbles can be removed and oil inserted before the cable section descends into the high pressure ocean environment.

The present invention is an apparatus for filling with fluid or bleeding fluid out of the cable section at a service point where a removable plug is located. The apparatus includes a block which has a cavity, and a gasket and a clamping device for sealably attaching the block to one of the cable service points so that the cavity is sealed about a respective plug. The block has a pair of passageways which extend outwardly from the cavity to respective spaced apart ports. A fitting is connected in the port of one of the passageways for filling or bleeding fluid through the plug opening, and a screwdriver is slidably fitted through the other passageway for loosening or tightening the plug in the plug opening. O-rings may be provided for making a seal between the screwdriver and its respective passageway. In this manner, a seal of the cable service point is maintained while: (1) the plug is loosened; (2) fluid is inserted in or bled from the cable section; and (3) the plug is tightened in the plug opening.

OBJECTS OF THE INVENTION

An object of the present invention is to provide an apparatus for filling with fluid or bleeding fluid out of a container which is closed by a plug.

Another object is to provide an apparatus for filling with fluid or bleeding fluid out of a cylindrical container which is opened and closed by a threaded plug.

These and other objects of the invention will become more readily apparent from the ensuing specification taken together with the drawings.

DESCRIPTION OF THE DRAWINGS

FIG. 1 is a side view, partly in cross section, of a fluid fill or bleed apparatus sealably attached to a cylindrical container portion.

FIG. 2 is a view taken along plane II — II of FIG. 1.

FIG. 3 is an illustration of a portion of FIG. 1 with the plug of the cylindrical container partially removed to open the container for filling or bleeding purposes.

DESCRIPTION OF THE PREFERRED EMBODIMENT

Referring now to the drawing wherein like reference numerals designate like or similar parts throughout the several views there is illustrated in FIG. 1 an apparatus 10 for filling or bleeding fluid out of a container 12 which is opened and closed at a fill hole 13 by a threaded plug 14. As illustrated in FIG. 3, the plug 14 may be provided with a passageway 15 which opens the container when the plug 14 is partially removed. The passageway 15 may have a longitudinal portion which opens into the bottom of the plug and which communicates with a lateral portion which opens into the side of the plug. The container 12 may be a tubular portion of an oil-filled cable which is utilized in some Navy applications for servicing the cable.

The apparatus 10 includes a generally rectangularly shaped block 16 which has a bottom centrally located cavity 18. A bottom portion of the block 16 may be concave to conform to the exterior configuration of the tubular oil-filled section 12.

Means are provided for sealably attaching the block 16 to the tubular portion 12 so that the cavity 18 can be sealed about the plug 14. This sealing and attaching means may include a generally rectangular gasket 20 and a clamp 22. The gasket 20 circumscribes the bottom perimeter of the block 16 and may be retained by bolts 24. The clamp 22 may include a strap 26 which is fixed at one end to a side of the block 16 by a retainer 28 and is fixed at its other end to an opposite side of the block 16 by a bolt 30. Intermediate the strap is a drawscrew 32 for tightening the strap about the tubular section 12 so as to tightly seal the cavity 18 about the plug 14.

The block 16 has a pair of passageways 34 and 36 which extend outwardly from the cavity 18 to respective spaced apart ports 38 and 40. Passageway 34 may open into a top end of the cavity 18 and may extend radially from the tubular section 12, and the passageway 36 may extend from a side of the cavity 18 at an acute angle with respect to the passageway 34. The top end of the block 16 may be beveled at 42 sufficiently to enable the port 40 to open into a flat portion.

A fitting 44 is mounted through the port 40 and into the passageway 36 for filling or bleeding fluid through the plug opening 13. As illustrated in phantom at 46, a hose may be connected to the fitting 44 for inserting or bleeding fluid from the tubular portion 12 through the plug opening 13.

Means, such as a screwdriver 48, is slidably fitted through the other passageway 34 for loosening or tightening the plug 14 in the tubular portion 12. Means, such as O-rings 50, may be provided for sealing the screwdriver in the radially passageway 34 as the screwdriver extends therethrough. As illustrated in FIG. 1, the cavity 18 may have a larger diameter then the radial passageway 34. The screwdriver 48 may be provided with stop means, such as a snap ring 52 of larger diameter then the passageway 34, for engaging the top of the cavity 18 and stopping upward movement of the screwdriver in the radial passageway 34.

It is desirable that the block 16 be constructed of a transparent material, such as clear plastic, so that the various work functions of the apparatus can be visually inspected.

OPERATION OF THE INVENTION

In the operation of the invention the fluid fill or bleed apparatus 10 is installed upon a tubular portion 12 of an oil-filled cable which is payed out from the stern of a ship (not shown). The apparatus 10 is mounted with the gasket 20 making a seal around the plug 14 and is secured by the clamp 22. Prior to the present invention workmen were required to work with various oil-filled cable sections raised onto the fantail of a ship. This was not satisfactory and was extremely hazardous due to the variable sea state conditions. The present invention enables the oil-filled or bleed apparatus 10 to be mounted to cable portions 12 at a fluid port on the fantail of the ship as the cable extends out into the ocean. At this high point any air bubbles within a respective oil-filled cable section will rise to the port opening 13 and can be withdrawn and replaced with oil. This is important for satisfactory operation of the oil-filled cable at various depths in the ocean.

After the apparatus 10 is mounted on the cable portion 12 about a port opening 14 the screwdriver 48 is engaged with the plug 14 and unscrewed until the inside of the cable portion is communicated with the cavity 18 through the passageway 15 within the plug 14. The hose 46 can then be utilized for drawing a vacuum and removing any air bubbles from the oil-filled cable section and then replacing any voids in the cable with fresh oil. In the changing of hoses 46 the screwdriver can be utilized for closing and opening the port 13 to the oil-filled cable, and upon completing the operation the plug 14 is returned to the closed position as illustrated in FIG. 1. At all times during this operation the interior of the cable sections are sealed from ambient by the gasket 20 and the screwdriver O-rings 50, and the fluid hose 46 is utilized to control the removal and replacement of fluids within the oil-filled cable portion 12. Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for filling or bleeding fluid out of a container comprising:

a plug threaded in the container;

said plug having a longitudinal passageway which opens through the bottom of the plug and a lateral passageway which opens through the side of the plug so that the plug will close the container when fully inserted therein and will open the container when partially withdrawn therefrom;

a block which has a cavity;

means for sealably attaching the block to the container so that the cavity is sealed about the plug in a spaced relationship so as not to touch the plug;

said block having a pair of passageways which extend outwardly from the cavity to respective spaced apart ports;

a fitting connected in the port of one of the passageways for filling or bleeding fluid through the plug opening;

means slidable through the other passageway for withdrawing or inserting the plug in the plug opening; and means for sealing the withdrawing or inserting means to said other passageway, whereby a seal of the container is maintained while (1) the plug is partially withdrawn, (2) fluid is inserted in or bled from the container through the longitudinal and lateral passageways of the plug and (3) the plug is fully inserted in the plug opening to close off the container.

2. A device as claimed in claim 1 for filling or bleeding fluid into or out of a tubular container including:

the withdrawing and inserting means being a screwdriver and the plug having a screw head.

3. A device as claimed in claim 2 including said block being rectangular shaped and having an arcuate bottom;

a gasket about the cavity on the arcuate bottom of the block for sealing the cavity about the plug;

said block having a beveled edge opposite the arcuate bottom; and the port of the fluid passageway opening into said beveled edge.

4. A device as claimed in claim 3 including:

the screwdriver passageway extending radially from the tubular container;

said cavity being larger than the radially extending screwdriver passageway; and the screwdriver having stop means for engaging the top of said cavity and stopping upward movement of the screwdriver in the screwdriver passageway.

5. A device as claimed in claim 4 including:

said block being transparent so that the various functions of the apparatus can be visually inspected.

6. A device as claimed in claim 5 wherein the sealing and attaching means includes a strap and a screw clamp for tightening the strap about the container.

* * * * *